(12) United States Patent
Fakult et al.

(10) Patent No.: US 11,591,959 B2
(45) Date of Patent: Feb. 28, 2023

(54) GENERATOR AIR GAP HEATER

(71) Applicant: SAFRAN ELECTRICAL & POWER, Blagnac (FR)

(72) Inventors: Joseph Paul Fakult, Willoughby Hills, OH (US); William Wessel, Brooklyn, OH (US); Thomas Berry, Massillon, OH (US)

(73) Assignee: SAFRAN ELECTRICAL & POWER, Blagnac (FR)

( * ) Notice: Subject to any disclaimer, the term of this patent is extended or adjusted under 35 U.S.C. 154(b) by 1023 days.

(21) Appl. No.: 16/299,212

(22) Filed: Mar. 12, 2019

(65) Prior Publication Data

US 2019/0284997 A1  Sep. 19, 2019

Related U.S. Application Data

(60) Provisional application No. 62/642,061, filed on Mar. 13, 2018.

(51) Int. Cl.
*F02C 7/047* (2006.01)
*B64D 41/00* (2006.01)
(Continued)

(52) U.S. Cl.
CPC ............ *F02C 7/047* (2013.01); *B64D 41/007* (2013.01); *H02K 15/125* (2013.01); *H05B 3/34* (2013.01); *B64D 15/12* (2013.01); *H02K 3/12* (2013.01); *H05B 3/0004* (2013.01); *H05B 2214/02* (2013.01)

(58) Field of Classification Search
CPC .......... H05B 3/00; H05B 3/0004; H05B 3/14; H05B 3/146; H05B 3/16; H05B 3/34; H05B 3/342; H05B 3/36; H05B 2214/02; F02C 7/047; B64D 41/007; B64D 15/12; H02K 15/125; H02K 3/12
USPC ....... 219/201, 202, 205, 209, 425, 426, 494, 219/497, 522, 528, 534, 535, 541, 547, 219/549, 600, 629, 635, 631
See application file for complete search history.

(56) References Cited

U.S. PATENT DOCUMENTS 2,745,942 A   5/1956  Cohen
6,198,186 B1* 3/2001  Wallace ............... H02K 15/125
                                              219/201
(Continued)

FOREIGN PATENT DOCUMENTS

DE         3316234 A1   11/1984

OTHER PUBLICATIONS

International Search Report and Written Opinion, International Application No. PCT/US2019/021733, dated May 3, 2019, 13 pages.

*Primary Examiner* — Hung D Nguyen
(74) *Attorney, Agent, or Firm* — Rankin, Hill & Clark LLP

(57) ABSTRACT

A heater that inhibits the formation of ice in an air gap separating a stationary stator and a rotatable rotor of a rotating machine. The heater includes a plurality of stringers configured to be arranged in associated winding slots of the associated stator adjacent the air gap, and extending between two ends of the heater. Each of the stringers includes two electrical resistance heating traces arranged between two electrical insulation layers that are arranged between two thermal conduction layers. The traces extend along an entire length of each of the stringers between the two ends of the heater. The traces are electrically isolated from each other.

20 Claims, 5 Drawing Sheets

(51) Int. Cl.
  *H02K 15/12*  (2006.01)
  *H05B 3/34*  (2006.01)
  *B64D 15/12*  (2006.01)
  *H02K 3/12*  (2006.01)
  *H05B 3/00*  (2006.01)

(56) References Cited

U.S. PATENT DOCUMENTS

| | | |
|---|---|---|
| 6,593,547 B1 | 7/2003 | Raad |
| 8,575,900 B2 | 11/2013 | Spierling |
| 2014/0166638 A1 | 6/2014 | Irgens et al. |

* cited by examiner

GENERATOR AIR GAP HEATER

BACKGROUND

Ram Air Turbine (RAT) generators are included on many airliners to generate electricity for operation of the airliner in emergency situations. RAT generators are not used on normal flights, but must be available during any phase of a flight for use in the event the primary power source does not provide adequate power to the airliner. When the generator is not in use, it is normally stored in an exterior compartment of the airliner, where the internal components of the generator are exposed to all the atmospheric temperature, pressure, and humidity changes encountered throughout the flight envelope, which can cause the formation and accumulation of ice in and around the internal components of the RAT generators.

Electrical power generators, including RAT generators, have small air gaps between their internal rotating (rotor) and non-rotating parts (stator), which must be kept free of ice accumulation, which could prevent free rotation of the rotor and operation of the generator.

BRIEF DESCRIPTION

According to one aspect, a heater for an associated rotating machine having an associated stationary stator separated by an air gap from an associated rotatable rotor is provided. The heater includes a plurality of stringers configured to be arranged in associated winding slots of the associated stator adjacent the air gap, and extending between two ends of the heater. Each of the stringers includes two electrical resistance heating traces arranged between two electrical insulation layers that are arranged between two thermal conduction layers. The traces extend along an entire length of each of the stringers between the two ends of the heater. The traces are electrically isolated from each other.

According to another aspect, a rotating machine includes a stator including a plurality of winding slots, a rotor configured for rotational movement relative to the stator and separated from the stator by an air gap, and a heater including a plurality of stringers arranged in the winding slots adjacent the air gap, and extending between two ends of the heater. Each of the stringers include two electrical resistance heating traces in thermal communication with the air gap, and arranged between two electrical insulation layers that are arranged between two thermal conduction layers. The traces extend along an entire length of each of the stringers between the ends of the heater. The traces are electrically isolated from one another.

DETAILED DESCRIPTION

Figure 1:
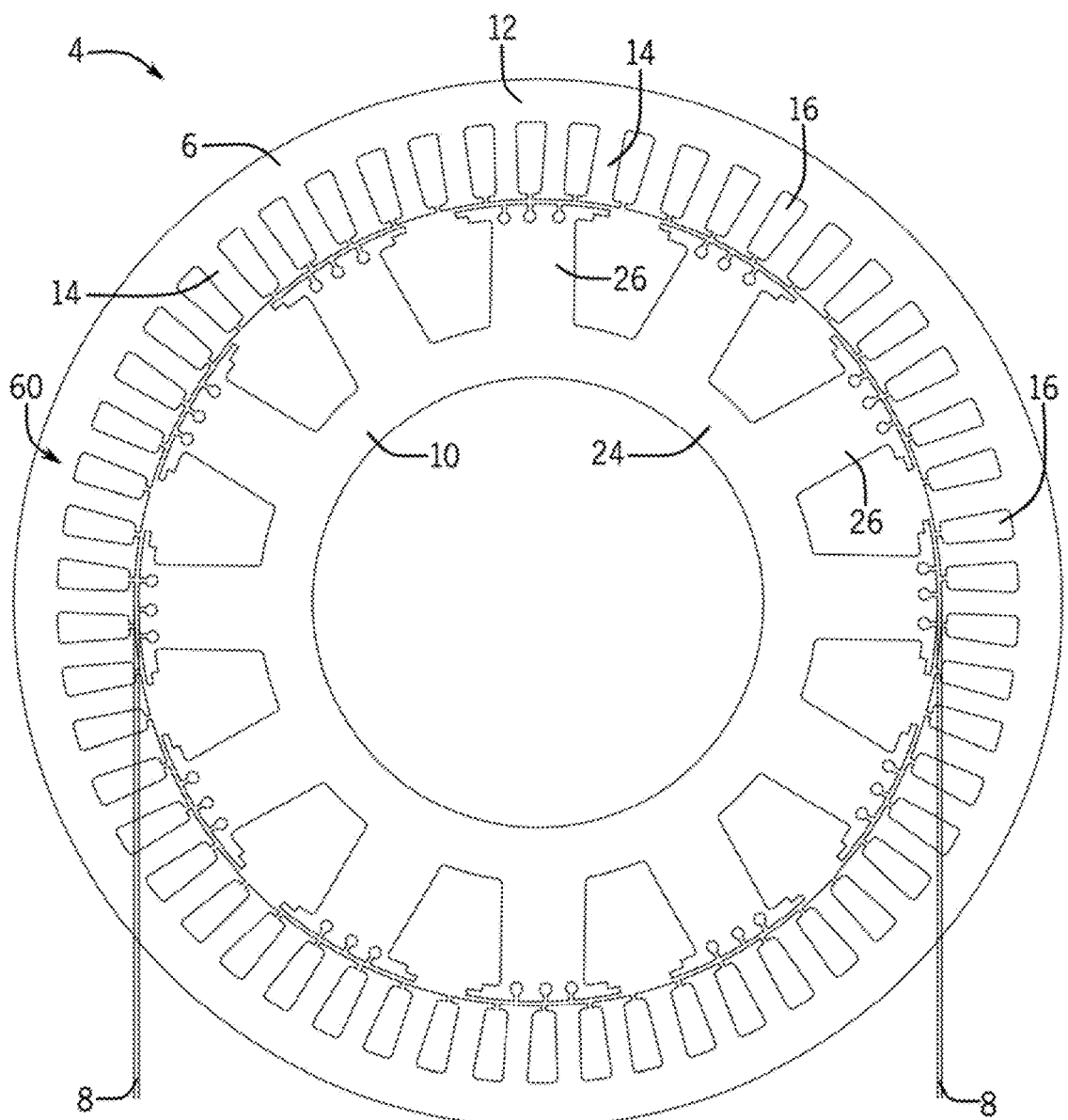
FIG. 1 is a schematic front end view of a generator.

As used herein, "thermally conductive" or cognate terms, mean a material that has thermal conductivity (k) of at least 1 W/(m·K) at 25° C. Further, as also used herein, "electrically conductive" or cognate terms, mean a material that has conductivity (a) of at least $1 \times 10^2$ S/m at 20° C. As also used herein, "electrically insulative" or cognate terms, mean a material that has resistance (p) of at least $1 \times 10^2$ (Ω·m) at 20° C.

The present disclosure includes an electric anti-icing/de-icing heater which inhibits ice formation and accumulation within an enclosure of an associated rotating machine, e.g. a generator, even when the generator is not in use. The present disclosure includes an electrical resistance heater that is mounted on the generator, and operated in order to inhibit the formation of ice in an air gap between a stator and a rotor of the generator when the generator is not in use. The heater is operated by power, not from the generator, but from an external power source.

In one non-limiting embodiment, the heater is used in the technical field of aircraft electrical power generators driven by a Ram Air Turbine (RAT). However, the heater is not specifically limited to RAT generators, and may be used in any field for generators, turbines, pumps, electric motors, transformers including a stator and rotor, or even in non-electrical components for which heating is required, regardless of the operating environment including being used to prevent the formation and accumulation of ice on other devices (e.g., aircraft wings, or house roofs), to heat components for manufacturing or processing (e.g., to cure epoxy or varnish, or to reduce fluid viscosity), or to warm various items (e.g., in food preparation, or environmental heating).

The generator may be a RAT generator included in an aircraft, and the heater may use electric power provided by the aircraft when the RAT generator is not is use. The heater is operated to maintain the air gap of the generator above the freezing temperature of water when the generator is exposed to temperatures below 0° C. (e.g. during aircraft flight), thereby inhibiting the formation and accumulation of ice between the stator and rotor.

A difficulty encountered in this application, is that a RAT generator housing removes heat from the stator to the outside ambient environment very efficiently. As a result, a relatively high heating power is required to keep the air gap temperature above the freezing point of water when the generator is subjected to its coldest outside ambient condition during. Such high heating power can create localized hot areas on the heater itself, limiting its long-term reliability. The present heater is able to get sufficient heat to the air gap, yet operate at a low enough power level that it can inhibit hot-spots, and maintain the heating temperatures low enough to ensure long insulation life. Other difficulties associated with heating a RAT generator include the small amount of physical space available for the heater; the temperature limits of adjacent insulation materials compared to localized hot spots in the heater; cost of heater components; and the lead time for the development and delivery of the heater for commercial use.

When used in a RAT, the heater has several beneficial aspects, including having a small physical size and thus being able to fit within the physical space available inside the RAT, and without unduly reducing clearances around the winding coil overhangs. The heater can also be attached to the generator without requiring removal of, or restricting available space for, the generator's electromagnetic materials (i.e. iron, winding wire, and insulation). The heater is capable of raising and maintaining the generator air gap above the freezing point of water, even when the generator is in an extremely cold environment, for example during a flight envelope, which can reach temperatures as low as −54° C. The heater is capable of operating at room temperature ambient conditions (i.e. typically 25° C.) without any of its parts exceeding temperatures which could damage or degrade its own electrical insulation materials, or that of the generator winding. The heater can maintain electrical isolation from the generator windings and the generator case when 1500 VAC dielectric stress is applied. The leakage current from the heater to any other electrically isolated conductor may be less than 2 milliamps.

The heater may be capable of operating reliably for 126,000 hours including 14,000 on/off cycles, when exposed to self-heating temperatures, generator operating temperatures, and the full range of ambient temperatures during a flight envelope (e.g. −54° C. to 55° C.). The heater can include two redundant heating circuits, which are electrically isolated from each other. Accordingly, failure of one circuit does not induce a failure of the other redundant circuit, thus fulfilling the system requirement for a redundant heater. Materials used in the heater may be capable of withstanding temperatures ranging from −54° C. to 260° C. The current drawn by the heater may be less than 2.84 amps when powered at a voltage of 115 VAC. The heater provides a generally uniform heat, such that the heater may have no spot on the heater that exceeds 200° C., which may be well below the short-term material temperature limit (e.g. 260° C.) and thus may achieve long-term reliability. This may be aided by having good thermal contact between the heater and the mass of the generator, which may inhibit creation of hot spots on the heater. The heater can also be produced by a method that minimizes recurring production cost and non-recurring development cost and lead time.

The heater can include spaced apart heating elements (i.e. "stringers) that extend between two opposite ends of the heater. The stringers may each have a very small thickness, which allows the stringers to be arranged directly into the winding slots of the generator's stator without significant negative impact on the available space for winding wires. When the stringers are arranged in the winding slots, the stringers can be located near the air gap, which facilitates heating the air gap to inhibit ice formation in the air gap. The heater can include integral electrical connections between the various stringers, which connections can also have a very small thickness like the stringers, and are therefore unobtrusive to the overall generator design.

The stringers can include electrical resistance heating traces, which may comprise a metallic material with a relatively large and positive temperature coefficient of resistance, in which the resistance increases strongly with temperature. This characteristic allows a higher heating power in cold ambient conditions and lower heating power in hot ambient conditions. Other embodiments may include resistive materials with different resistance characteristic. The electrical resistance heating traces can have a "zig-zag" patter in the areas of the stringers, which have high power density, in order to increase the resistance and to make maximal use of the available width in the stringers.

The stringers can include two thermal conduction layers (e.g. a thermally conductive metallic foil) applied on either side of the traces, to act as a heat sink and heat spreader, and to promote good heat flow so that localized hot spots with high temperatures are minimized and the temperature is kept below allowable long-life temperature limits of insulation materials.

The present disclosure features two side-by-side electrical resistance heating traces. A portion of the traces in the stringers can have a very small width and are arranged in the generator near the air gap where more resistive heat generation is desired and can be dissipated efficiently to inhibit the formation of ice. However, portions of the two traces that are on two ends of the heater and not near the air gap can have a larger width and are arranged on the generator where heat generation is not as important and where heat dissipation is not as efficient (e.g. at the ends of the winding coil overhangs).

Some portions of the electrical resistance heating traces may include a compound material (e.g. layered, or overplated material) having higher electrical conductivity that other portions of the traces, which higher electrical conductivity allows reduced heat generation in locations where heat dissipation is not as efficient. The heater may have a generally flat shape, which can be rolled into a cylindrical configuration for being arranged inside a bore of the stator so that the stringers can be easily arranged in the multiple winding slots of the stator. The heater can include two circuits, i.e. a primary circuit and a redundant circuit, of which the two traces are included, respectively, and which are electrically isolated from one another and integral to the heater. The heater may have a modular design, with integrated lead wires such that no electrical connections are required at the stator assembly level. In application, the heater has been shown to be relatively fault tolerant and the circuits can withstand significant damage to the heating element traces without overheating locally.

Figure 2:
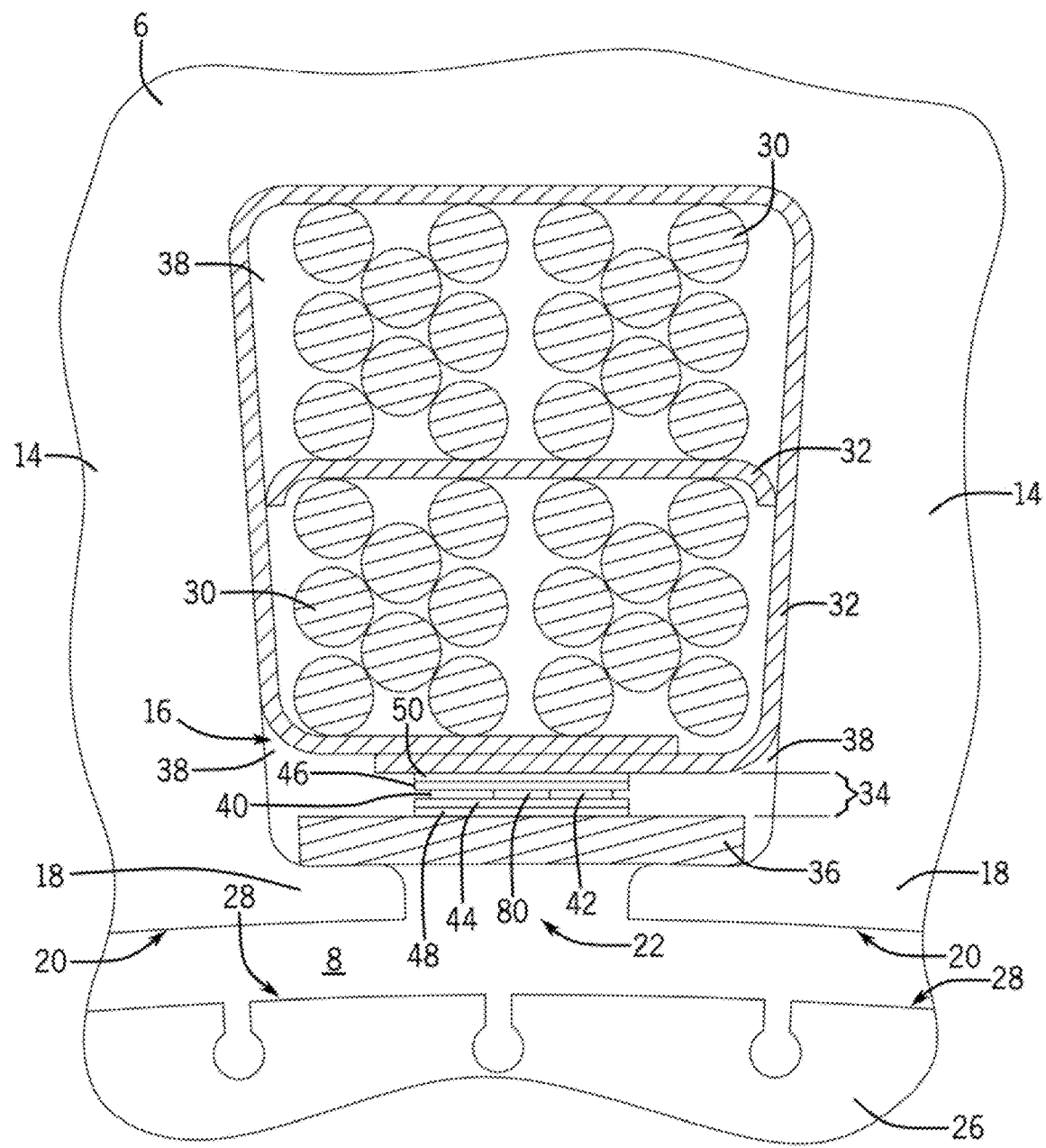
FIG. 2 is a schematic front end view of a winding slot of a stator of the generator of FIG. 1.

The heater will now be further explained with reference to the attached FIGS. 1-7. The present disclosure provides a heater 2 (FIGS. 3-5), which may be used with a rotating machine 4 (FIGS. 1-2). The rotating machine 4, referred to herein as a "generator 4," includes a stationary stator 6 separated by an air gap 8 from a rotatable rotor 10, which is configured for rotational movement relative to the stator 6. The stator 6 includes a tube-shaped stator core 12 and a plurality of stator arms 14 extending radially inward from the stator core 1 and axially along a length of the tube-shaped stator core 12. The stator arms 14 are spaced from one another as depicted, to define a plurality of winding slots 16 arranged between each of the stator arms 14 and extending axially along the length of the stator core 12. Free ends 18 of the stator arms 14 define interior walls 20, which are spaced from one another to define axially-extending openings 22 between the air gap 8 and the winding slots 16. The stator 6 may comprise iron.

The rotor 10 includes a rotor core 24, and rotor arms 26 extending radially outward from the rotor core 24. The air gap 8 is the space between the interior walls 20 of the stator arms 14 and the exterior walls 28 of the rotor arms 26. The air gap 8 may incur ice formation when the generator 4 is exposed to temperatures below 0° C. Such ice may inhibit the rotor 10 from rotating relative to the stator 6 and thereby inhibit the generator 4 from producing electricity. The rotor 10 may include iron.

The winding slots 16 can each include a plurality of winding wires 30, electrical insulation paper 32, a stringer 34 of the heater 2, a retention wedge 36, and an impregnated resin or varnish 38. The insulation paper 32 may be arranged around the winding wires 30 as depicted in FIG. 2. The stringer 34 is arranged radially inward from the winding wires 30 and closer to the air gap 8 than the winding wires 30. The wedge 36 may be arranged closer to the air gap 8 than the stringer 34 and spans the opening 22 in order to hold the stringer 34 in the winding slot 16 and inhibit the stringer 34 from entering the air gap 8. The entire assembly may be impregnated with the resin 38.

The generator 4 may be assembled as depicted in FIG. 2, by arranging the winding wires 30 and insulation paper 32 in the winding slots 16. The stringer 34 may then be introduced in the winding slots 16 radially inward from the winding wires 30 and insulation paper 32. The retention wedge 36 may then be arranged in the winding slots 16 at an opening 22 of the winding slots 16 to prevent the stringer 34 from exiting the winding slots 16 through the opening 22 and entering the air gap 8. Thereafter, the entire stator assembly, including the stator 6 and the components (i.e. winding wires 30, insulation paper 32, stringer 34, and retention wedge 36) in the winding slots 16, may be impregnated (e.g. vacuum impregnated) with resin 38, which is cured to harden in the voids between the components, and the voids in the winding slots 16 between the components and the stator arms 14.

For clarity, the components in the winding slots 16 (i.e. winding wires 30, insulation paper 32, stringer 34, and retention wedge 36) are not shown in FIG. 1, and are shown only in one winding slot 16 in FIG. 2. However, it should be understood that in an embodiment, each winding slot 16 includes winding wires 30, insulation paper 32, a stringer 34, and a retention wedge 36. In another embodiment, only some of the winding slots 16 of the stator 6 include a stringer 34. The stringers 34 may be arranged in the winding slots 16 such that the stringers 34 contact the insulation paper 32 and contact the retention wedge 36 as depicted in FIG. 2.

The winding wires 30 may include copper, aluminum, or other electrically conductive material. The winding wires 30 may be a single electrically conductive wire repeatedly wrapped about a stator arm 14 to extend through adjacent winding slots 16; or may comprise a plurality of such wires. Winding wires 30 are bundled and wrapped around one or more stator arms 14, each of which are between two adjacent winding slots 16.

The insulation paper 32 may comprise an electrically insulative material that provides electrical insulation between stator arm 14 and winding wires 30, thus serving to electrically isolate the winding wires 30 from the stator 6. The insulation paper 32 may comprise Nomex® available from Dupont, which is a synthetic aromatic polyamide polymer, or other materials such as Kapton®, Melinex®, Mylar®, or Teonex®, which are also available from Dupont.

As depicted in FIG. 2, each of the stringers 34 has a thin and flat cross-sectional shape, which allows the stringers 34 to make good thermal contact with the adjacent material in the winding slots 16, particularly the retention wedge 36 and the insulation paper 32, both of which are also flat, and thus help to reduce hot spots.

Each of the stringers 34 can include two side-by-side electrical resistance heating traces, i.e. a first electrical resistance heating trace 40 and a second electrical resistance heating trace 42, in thermal communication with the air gap 8, and arranged between two electrical insulation layers 44, 46, which are arranged between two thermal conduction layers 48, 50. The first and second traces 40, 42 may include a metal or other electrical resistance heating material, such as chromium, iron, aluminum, copper, ceramic, steel, platinum, molybdenum disilicide, molybdenum, silicon carbide, and combinations or alloys thereof. Nickel, including Ni 201 and Ni 200, also known as Nickel Alloy Ni-201 and Commercially Pure Nickel, may be included in the first and second traces 40, 42. Ni 201 only differs from Ni 200 by its carbon content (0.02% max in Ni 201 versus 0.15% max in Ni 200). This slight drop in carbon allows Ni 201 to be utilized in higher temperature applications (over 600° F.).

Other materials that can be included in the first and second traces 40, 42 include for example, FeCrA alloy, nichrome (NiCr 80/20 alloy), cupronickel (CuNi alloy), molybdenum disilicide (MoSi2), PTC ceramic (e.g. barium titanate and lead titanate composites), PTC rubber, or Incoloy. In one embodiment, the electrical resistance heating traces comprise Nickel 201. The first and second traces 40, 42 have a large positive temperature coefficient of resistance (TCR), which allows their resistance to increase strongly with temperature. In addition to limiting the heating power during hot ambient conditions, e.g. above 30° C., the large positive TCR also allows more heating power when the ambient is cold, e.g. below 0° C.

Figure 3:
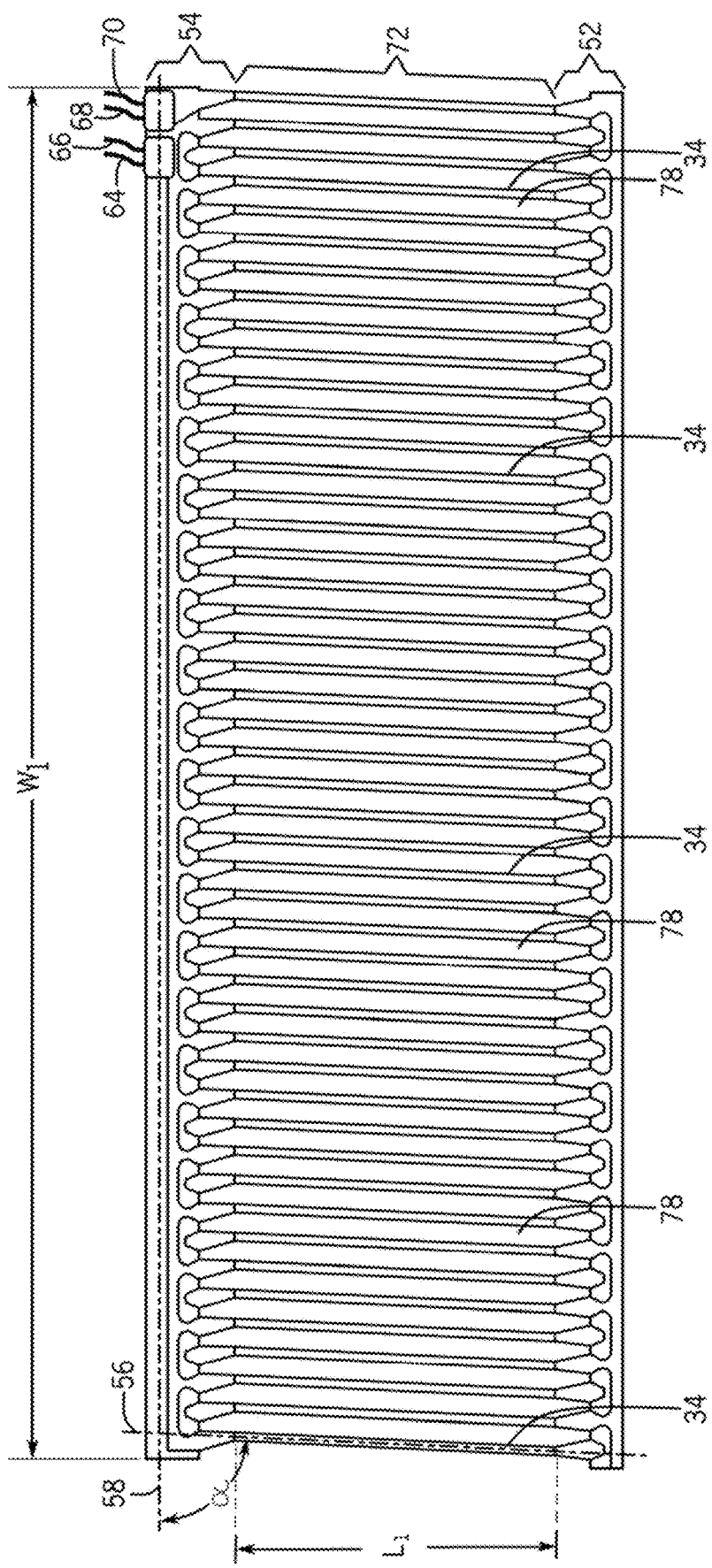
FIG. 3 is a schematic plan view of a heater.

As best depicted in FIG. 3, the plurality of stringers 34 extend in a stringer section 72 between two ends 52, 54 of the heater 2. The stringers 34 are separated from one another by spaces 78, such that only the ends of each of the stringers 34 are attached to the respective ends 52, 54 of the heater 2. In one embodiment, the two ends 52, 54 of the heater 2 are parallel to each other, or substantially so, and the stringers 34 each have a stringer angle α—which is the smaller of two angles measured from a midline 56 of a stringer 34 to a midline 58 of one of the two ends 52, 54—that is not 90°. The stringer angles α corresponds to angles of the winding slots 16 relative to a front end 60 and rear end of the stator 6 as the winding slots 16 extend from a front end 60 to a rear end of the stator 6, which front end 60 and rear end of the stator are also parallel. By having stringer angles α that corresponds to the angles of the winding slots 16, the two ends 52, 54 of the heater 2 can be arranged parallel to the front end 60 and the rear end of the stator 6 when the stringers 34 are arranged in the winding slots 16. The stringer angle α may depend on the geometry of the stator electromagnetic design, which may include a so-called "skew angle," which improves the quality (i.e. shape of the sinusoidal electrical waveform) of the electrical power generated. The stringer angle α may range for example, from 75-90°, from 80-89°, or be arranged at other angles that correspond to the angles of the winding slots 16 relative to the front end 60 and rear end of the stator 6.

Figure 6:
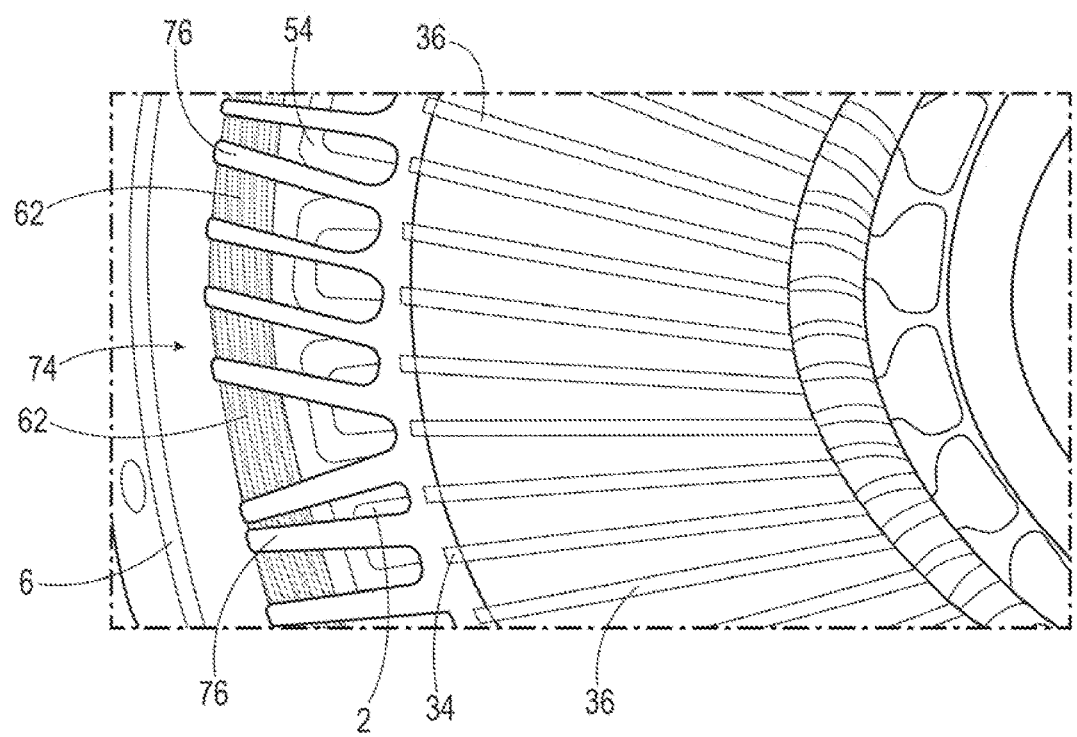
FIG. 6 is a photograph of a stator assembly.

The lengths $L_1$ of the stringers 34 correspond to lengths of the winding slots 16 measured from the front end 60 to the rear end of the stator 6, such that the two ends 52, 54 of the heater 2 stick out past the front end 60 and rear end of the stator 6 as depicted in FIG. 6, and are not arranged in the air gap 8 or in the winding slots 16. The two ends 52, 54 of the heater 2 can be secured for example, to the winding coil overhangs 62 with lacing as depicted in FIG. 6, or by other means or to other portions of the generator 4 so the two ends 52, 54 are not entirely free to move when subject to a force such as flowing air during operation of the generator 4.

Figure 5:
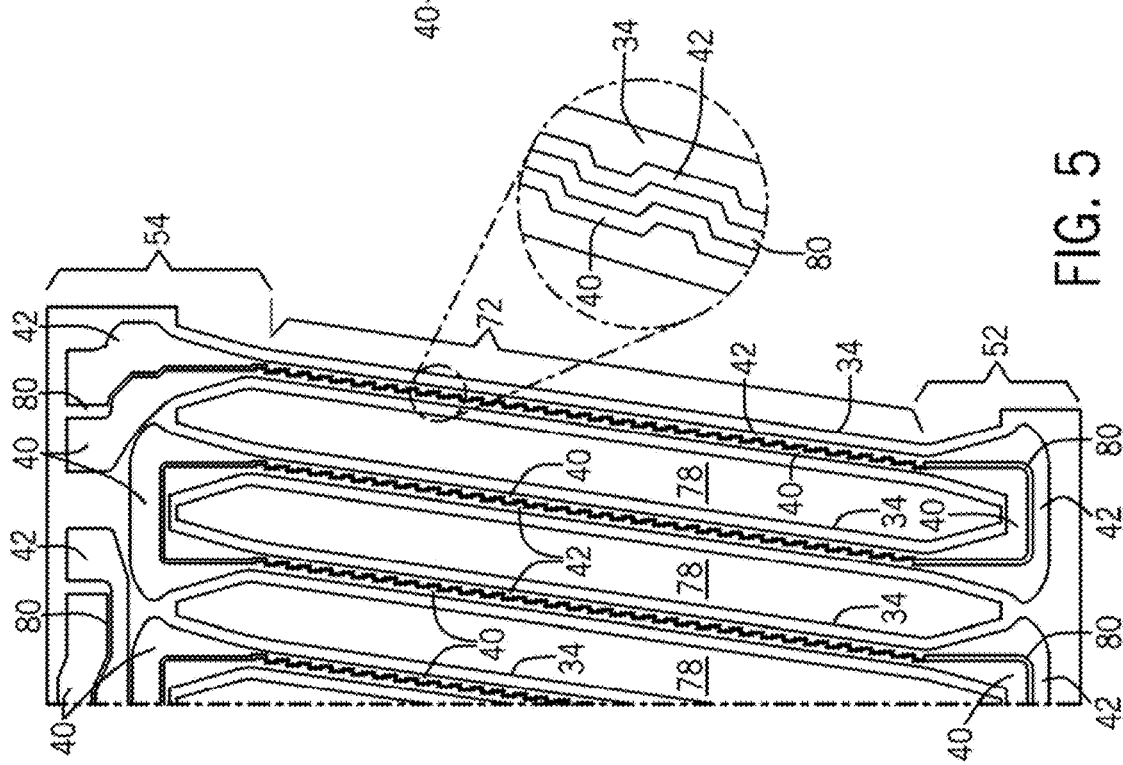
FIG. 5 is a schematic plan view of another portion of the heater of FIG. 3.

As depicted for example in FIG. 5, portions (herein "stringer portions") of the first trace 40 and the second trace 42 are included on each of the stringers 34; and other portions (herein "end portions") of the first trace 40 and the second trace 42 are included on each of the ends 52, 54 of the heater 2.

The stringer portions of the first and second traces 40, 42 may be arranged in a parallel (i.e. side-by-side) non-linear pattern along the entire length $L_1$ of each of the stringers 34, such that the first and second traces 40, 42 are separated from each other by a gap 80. That is, the stringer portions of the first and second traces 40, 42 are not in contact with each other, and are not arranged in straight lines on the stringers 34 between the two ends 52, 54 of the heater 2. Instead, the stringer portions of the first and second traces 40, 42 may be arranged for example, in a side-by-side "zig-zag" pattern as best depicted in the detailed portion of FIG. 5 to create two parallel tortuous paths between the two ends 52, 54 of the heater 2 that are longer, and cover a greater width on each of the stringers 34, than would two traces having parallel straight paths between the two ends 52, 54 of the heater 2.

This non-linear pattern serves to lengthen the resistive paths of the first and second traces 40, 42 in the stringer portion, which is a way of controlling the overall heater resistance, and which also makes maximal use of the full available width of the area of each stringer 34 for heat input. This parallel non-linear pattern also helps spread out the heat that is generated by the first and second traces 40, 42 across the width of each stringer 34. For example, if only the first trace 40 is working and not the second trace 42, then heat from the first trace 40 would not only heat the one side of each stringer 34, but would also heat the other side of each stringer 34 and thus more uniformly heat the air gap 8 to keep it ice-free.

The end portions of the first and second traces 40, 42 have a width that is greater than a width of the stringer portions as best depicted in FIG. 5. However, this is not required, and the end portions may have the same or similar thickness as the stringer portions. That is, the first and second traces 40, 42 spread out from the narrow parallel non-linear pattern on the stringers 34, to wider paths on the two ends 52, 54 of the heater 2, such that the end portions of the first and second traces 40, 42 occupy a greater width than the stringer portions.

The end portions of the first and second traces 40, 42 can be over-plated with a copper layer, which increases the thickness of the end portions of the first and second traces 40, 42. The wider end portions and increased thickness due to the addition of the high-conductivity (i.e. electrical and thermal conductivity) copper layer, along with reduced resistance in the end portions due to the copper layer, thereby reduces the heat generation and allows the end portions to operate with less temperature rise than the stringer portions. This is helpful because the end portions of the first and second traces 40, 42 do not dissipate heating power as well as the stringer portions.

This makes the end portions produce less heat than the stringer portions of the first and second traces 40, 42. The end portions can extend between adjacent stringer portions of the first and second traces 40, 42 to electrically connect adjacent stringer portions of the first and second traces 40, 42. The end portions of the first and second traces 40, 42 also electrically connect to a plurality of electrical connectors including lead wires 64, 66, 68, 70 configured to electrically connect the first and second traces 40, 42, and thereby the heater 2, to an external power source to provide power to resistively heat the first and second traces 40, 42. The two electrical connectors can be electrically isolated from each other.

For example, lead wires 64 and 68 may be electrically connected to opposite ends of the first trace 40, and lead wires 66 and 70 may be electrically connected to opposite ends of the second trace 42. The first trace 40 and lead wires 64, 68 may comprise a first circuit, and the second trace 42 and lead wires 66, 70 may comprise a second circuit. The first circuit may be electrically isolated from the second circuit wherein the gap 80 is arranged between the first and second traces 40, 42 from lead wires 64, 66 to lead wires 68, 70, and thus the first and second circuits are redundant circuits. The heater 2 may comprise only one circuit, or multiple redundant circuits without departing from the scope of this disclosure. In one embodiment, the heater 2 is manufactured complete as a single component with attached lead wires 64, 66, 68, 70, such that no circuit connections are required during attachment to the stator 6.

The two ends 52, 54 of the heater 2 have a width $W_1$ and thus the heater 2 has a certain number of stringers 34, which can be arranged in a corresponding number of winding slots 16. If the number of winding slots 16 on a particular stator 6 is more than the number of stringers 34 on the heater 2, a second heater can be used to fill the additional winding slots 16 with stringers from the second heater. In this respect, the heater 2 is modular and the second heater or more heaters can be connected to each other in series of parallel. The heater 2 may be assembled in a flat condition, but is flexible along the width $W_1$, so that the heater 2 can be rolled into a cylindrical tube and arranged inside the bore of the stator 6 so that the stringers 34 can be arranged inside the winding slots 16.

The heater 2 can comprise other layers, including for example, a base layer on which the two traces 40, 42 are initially formed. Other layers may be included as desired.

The two electrical insulation layers 44, 46 can cover the entirety of the first and second traces 40, 42 in order to provide electrical insulation to the first and second traces 40, 42 to keep them electrically isolated from one another. For this purpose, the two electrical insulation layers 44, 46 may comprise polyimide or other electrical insulation material, or no insulation material at all if electrical isolation can be achieved by other methods. In one embodiment, the first and second traces 40, 42 are arranged between, and electrically insulated with two electrical insulation layers 44, 46 each including polyimide film. The insulation layers 44, 46 may include other electrical insulation material, such as polyester film or polyamideimide film, as long as the insulation layers 44, 46 meet the dielectric and operating temperature requirements for the application.

Figure 4:
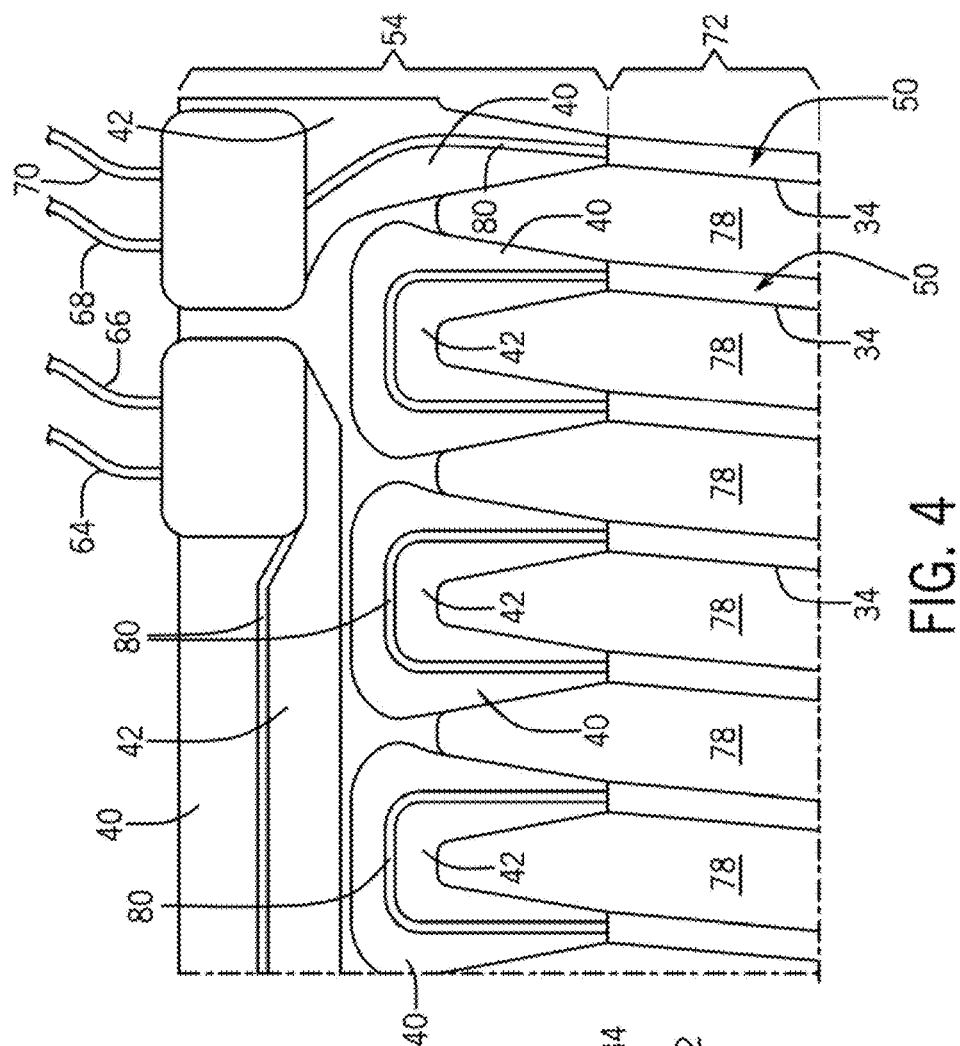
FIG. 4 is a schematic plan view of a portion of the heater of FIG. 3.

The two insulation layers 44, 46 may each contact the first and second traces 40, 42, and may each have a thickness of 0.02-0.08 mm, 0.03-0.07 mm, or 0.04-0.06 mm. In one embodiment the two insulation layers 44, 46 may each have a thickness of 0.049-0.053 mm, or 0.051 mm. The two insulation layers 44, 46 may each have a different thicknesses than the other insulation layer. At these thicknesses ranging from 0.02-0.08 mm, the first and second traces 40, 42 may be visible through the two insulation layers 44, 46. As such, even though the first and second traces 40, 42 are depicted in FIGS. 4 and 5, it will be understood that the first and second traces 40, 42 may nevertheless still be covered by the two insulation layers 44, 46.

The two thermal conduction layers 48, 50 can be included to act as heat sinks for the heat generated by the first and second traces 40, 42, so as to evenly distribute the heat to the air gap 8 and to further avoid the creation of hot spots along the lengths $L_1$ of the stringers 34. The two thermal conduction layers 48, 50 may comprise aluminum, for example aluminum foil, or other thermally conductive material such as copper so as to effectively absorb and distribute the heat generated by the first and second traces 40, 42, or no thermal conduction layers at all.

The conduction layers 48, 50 can act as a heat sink and heat spreader to reduce localized hot spots on the stringers 34, and enhance heat transfer to the adjacent parts of the stator 6 like the air gap 8, which is located physically near the stringers 34 and which is the specific area to be heated. Accordingly, the total heater power required can be minimized. The conduction layers 48, 50 can also increase the strength and stiffness of the stringers 34, which makes the heater 2 less susceptible to handling damage, and makes assembly easier.

In an embodiment, the first and second traces 40, 42 and the two electrical insulation layers 44, 46 are arranged between the two thermal conduction layers 48, 50. The two thermal conduction layers 48, 50 may each contact only one of the two electrical insulation layers 44, 46 as depicted in FIG. 2. In one embodiment, the two thermal conduction layers 48, 50 may be included only on the stringers 34 (and not on the two ends 52, 54) to cover only the stringer portions of the first and second traces 40, 42. This is depicted in FIG. 4, where one thermal conduction layer 50 is visible and covers over the first and second traces, which are not visible because they are covered by the one thermal conduction layer 50.

The high heat generated by the narrow stringer portions of the first and second traces 40, 42 is therefore more evenly distributed by the two conduction layers 48, 50. The end portions of the first and second traces 40, 42 generate lower heat generated because they are wider than the narrow stringer portions, and therefore may not need to be covered by the two conduction layers 48, 50. FIG. 5 however, does not show the two conduction layers 48, 50 on the stringers 34. This done for the convenience of depicting the zig-zag configuration of the first and second traces 40, 42 on the stringers 34. In another embodiment, the two thermal conduction layers 48, 50 are also included on the two ends 52, 54 to also cover over the end portions of the first and second traces 40, 42.

The retention wedge 36 may be arranged in each winding slot 16 to inhibit the stringer 34 in the winding slot 16 from moving or from coming out of the winding slot 16. The retention wedge 36 may comprise glass epoxy board, such as FR-4, for example, which is a glass-reinforced epoxy laminate material, including a composite material of woven fiberglass cloth with an epoxy resin binder that is flame resistant. Other materials may be used for the retention wedge 36 as desired and appropriate for the application such as cotton phenolic composite, ceramic materials, or fiberglass laminate, for example.

The components in the winding slots 16 (i.e. the winding wires 30, insulation paper 32, stringer 34, and retention wedge 36) may be impregnated with a resin or varnish, which may be viscous during application and which hardens when cured. Impregnating the rotor assembly with a varnish may result in filling of the air pockets between the various components in the winding slots 16, and result in a more secure arrangement of components in the winding slots 16 and better thermal conduction of heat from the heater 2 to the air gap 8. This may inhibit hot spots, which could degrade nearby insulation materials. Impregnation may be accomplished by trickling, vacuum impregnation, roll dipping, hot dipping, vertical dripping, or other means. Application of a vacuum by vacuum impregnation may enhance the capability of the varnish to fill the air pockets. The resin or varnish 38 may comprise Herberts® Electro, Voltatex®, or Voltron® for example.

In the portions of the heater 2 which are within the length of the stator winding slot (i.e., the "stringers"), the heating element traces can be narrow, thus these areas have higher resistance and operate hotter. In one embodiment, the stringers 34 can each have a width of 2-3 mm, 2.35-2.45 mm, or about 2.39 mm. The heater 2 may have a thickness of 0.2-0.4 mm, 0.25-0.35 mm, or about 0.33 mm. The first and second traces 40, 42 can each have a thickness of 0.01-0.04 mm, 0.02-0.03 mm, or about 0.025 mm. The insulation layers 44, 46 may each have a thickness of 0.02-0.08 mm, 0.04-0.06 mm, or about 0.051 mm. The conduction layers 48, 50 can each have a thickness of 0.05-0.10 mm, 0.06-0.08 mm, or about 0.076 mm.

Because the combined thickness of the stringers 34 are very thin (about 0.33 mm), it is possible to fit the stringers 34 into each winding slot 16 of the stator 6 with minimal impact on the remaining area of the winding slot 16 that needs to be used for the winding wires 30.

The present disclosure can include routing both circuits (i.e. the first and second traces 40, 42) through each available winding slot 16. However, the present disclosure can also include routing the circuits in any combination of winding slots 16 including physically separating the circuits by larger distances so that a failure of one circuit does not adversely affect the other circuit.

The heater 2 is producible by current manufacturing technology, and is suitable for medium production rates. Commercial use of the heater 2 thus only requires a single part (i.e. the heater 2) and therefore requires no electrical connections during stator assembly. Furthermore, the amount and type of manufacturing tooling to make the parts at medium production rates is inexpensive, and has relatively short lead times, compared to some other prior art solutions.

Figure 7:
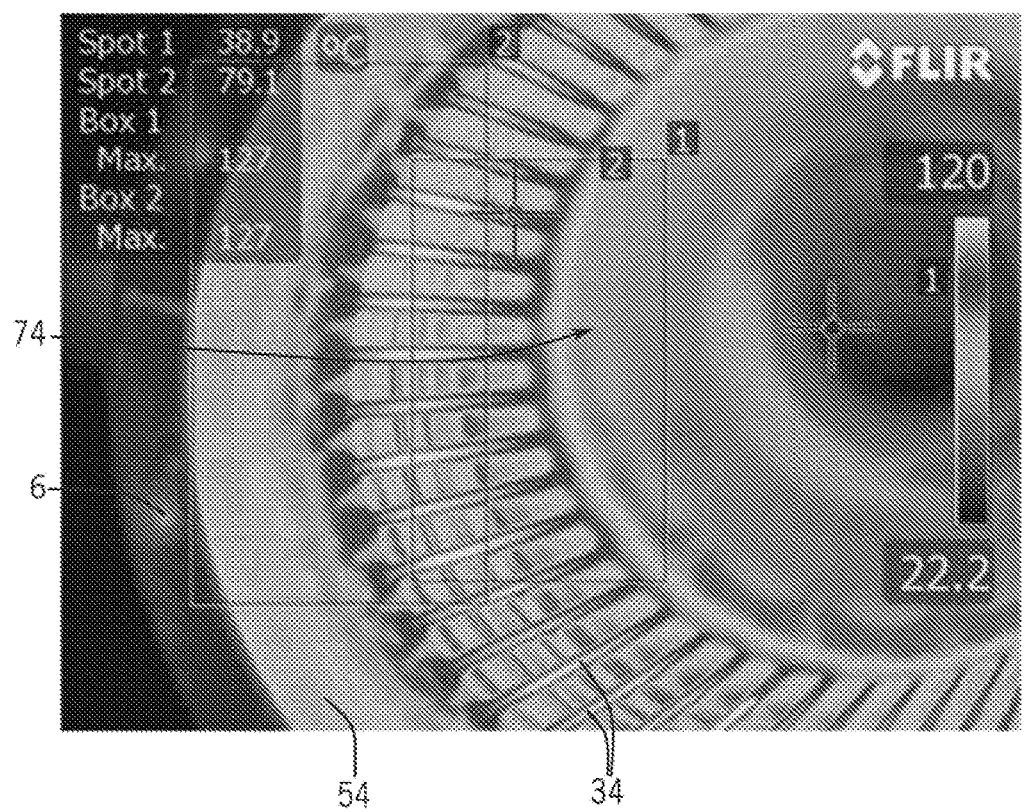
FIG. 7 is a thermal image photograph of the stator assembly of FIG. 6.

FIG. 6 is a photograph showing the inside bore 74 of the stator 6 including an attached heater 2. As depicted, the stringers 34 are arranged in each winding slot of the stator 6, and are held in the winding slots 16 by retention wedges 36. The end 54 of the heater 2 is tied to the winding coil overhangs 62 with lacing 76. The entire assembly is impregnated with varnish. FIG. 7 depicts a thermal image of the assembly of FIG. 6 while the heater 2 is operating. The stringers 34 are hotter than the end 54 of the heater as depicted by the end 54 having a darker shade. Also, the stringers 34 have no hot spots, and instead have a nearly uniform heat distribution as depicted by the same or similar shade being present along the length of the stringers 34.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A heater for an associated rotating machine having an associated stationary stator separated by an air gap from an associated rotatable rotor, the heater comprising:
   a plurality of stringers configured to be arranged in associated winding slots of the associated stator adjacent the air gap, and extending between two ends of the heater, each of the stringers including two electrical resistance heating traces arranged between two electrical insulation layers that are arranged between two thermal conduction layers;
   wherein the traces extend along an entire length of each of the stringers between the two ends of the heater, and
   wherein the traces are electrically isolated from each other.

2. The heater according to claim 1, wherein:
   a gap separates the traces along the entire length of each of the stringers; and the traces are arranged in a parallel non-linear pattern along the length of each of the stringers.

3. The heater according to claim 1, wherein:
   the traces each extend from the stringers onto the ends of the heater;

portions of the traces on the ends of the heater electrically connect portions of the traces on each of the stringers; and the portions of the traces on the ends of the heater define a width that is greater than portions of the traces on the stringers.

4. The heater according to claim 3, further including electrical connectors on one of the ends of the heater, wherein the electrical connectors are electrically connected to the traces and are configured to electrically connect the heater to a power source to induce electrical resistance heating of the traces.

5. The heater according to claim 3, wherein the thermal conduction layers do not cover the portions of the traces on the ends of the heater, and wherein the portions of the traces on the ends of the heater are covered with copper.

6. The heater according to claim 1, wherein:
the ends of the heater are parallel to each other; and
a stringer angle for each of the stringers is not perpendicular relative to the two ends of the heater.

7. The heater according to claim 1, wherein:
each of the stringers has a width of 2-3 mm;
the heater has a thickness of 0.2-0.4 mm;
each of the traces comprises nickel, and has a thickness of 0.01-0.04 mm;
each of the electrical insulation layers comprises polyimide, and has a thickness of 0.02-0.08 mm; and
each of the thermal conduction layers comprises aluminum, and has a thickness of 0.04-0.10 mm.

8. The heater according to claim 1, wherein:
the electrical insulation layers contact the traces; and
the thermal conduction layers contact the electrical insulation layers.

9. The heater according to claim 1, wherein the plurality of stringers each include a stringer section that extends in a zig-zag pattern between the two ends of the heater.

10. A rotating machine, comprising:
a stator including a plurality of winding slots,
a rotor configured for rotational movement relative to the stator and separated from the stator by an air gap, and
a heater including a plurality of stringers arranged in the winding slots adjacent the air gap, and extending between two ends of the heater, each of the stringers including:
two electrical resistance heating traces in thermal communication with the air gap, and arranged between two electrical insulation layers that are arranged between two thermal conduction layers;
wherein the traces extend along an entire length of each of the stringers between the two ends of the heater; and
wherein the traces are electrically isolated from one another.

11. The machine according to claim 10, further including winding wires and a plurality of retention wedges arranged in the winding slots, wherein:
the stringers are arranged closer to the air gap than the winding wires; and
the retention wedges are arranged closer to the air gap than the stringers and retain the stringers in the winding slots, wherein the wedges comprise laminated glass, and the wedges contact the stringers.

12. The machine according to claim 10, further including a cured resin arranged in voids in the winding slots adjacent to the stringers.

13. The machine according to claim 10, wherein the ends of the heater are arranged outside the air gap and are secured to winding coil overhangs.

14. The machine according to claim 10, wherein:
a gap separates the traces along the entire length of each of the stringers; and
the traces are arranged in a parallel non-linear pattern along the length of each of the stringers.

15. The machine according to claim 10, wherein:
the traces each extend from the stringers onto the ends of the heater;
portions of the traces on the ends of the heater electrically connect portions of the traces on each of the stringers; and
the portions of the traces on the ends of the heater have a width that is greater than portions of the traces on the stringers.

16. The machine according to claim 15, wherein:
the thermal conduction layers do not cover the portions of the traces on the ends of the heater; and
copper covers the portions of the traces on the ends of the heater.

17. The machine according to claim 10, wherein:
the ends of the heater are parallel to each other; and
a stringer angle for each of the stringers is not perpendicular relative to the two ends of the heater such that the ends of the heater are arranged parallel to ends of the stator.

18. The machine according to claim 10, wherein:
the electrical insulation layers contact the traces; and
the thermal conduction layers contact the electrical insulation layers.

19. The machine according to claim 10, further including electrical connectors on one of the ends of the heater, wherein the electrical connectors are electrically connected to the traces and are configured to electrically connect the heater to a power source to induce electrical resistance heating of the traces.

20. The machine according to claim 10, wherein the plurality of stringers each include a stringer section that extends in a zig-zag pattern between the two ends of the heater.

* * * * *